(12) United States Patent
Roberts

(10) Patent No.: US 9,568,733 B2
(45) Date of Patent: Feb. 14, 2017

(54) MAGNIFYING EYE GOGGLES ASSEMBLY

(71) Applicant: Antuan Roberts, Los Angeles, CA (US)

(72) Inventor: Antuan Roberts, Los Angeles, CA (US)

( * ) Notice: Subject to any disclaimer, the term of this patent is extended or adjusted under 35 U.S.C. 154(b) by 0 days.

(21) Appl. No.: 14/742,813

(22) Filed: Jun. 18, 2015

(65) Prior Publication Data
US 2016/0370587 A1    Dec. 22, 2016

(51) Int. Cl.
G02B 27/10  (2006.01)
G02B 27/01  (2006.01)
G02B 25/00  (2006.01)

(52) U.S. Cl.
CPC ......... G02B 27/0172 (2013.01); G02B 25/002 (2013.01); G02B 2027/0141 (2013.01); G02B 2027/0178 (2013.01)

(58) Field of Classification Search
CPC .................................................. G02B 25/002
USPC .......................................................... 359/630
See application file for complete search history.

(56) References Cited

U.S. PATENT DOCUMENTS

| 988,081 | A | 3/1911 | Denman |
| 1,892,444 | A | 12/1932 | Bausch |
| 2,024,322 | A | 12/1935 | Wittig |
| 4,767,203 | A | 8/1988 | Zahir |
| 4,971,429 | A | 11/1990 | Ishido et al. |
| 6,384,991 | B1 * | 5/2002 | Brown ............... A61F 9/029 359/813 |
| 6,614,603 | B2 | 9/2003 | Himmele |
| D583,850 | S | 12/2008 | Jaball |
| 2003/0112506 | A1 | 6/2003 | Cromer |
| 2006/0250574 | A1 * | 11/2006 | Grand ............... G02B 27/017 351/158 |
| 2007/0058248 | A1 | 3/2007 | Nguyen |
| 2013/0067626 | A1 * | 3/2013 | Sandor ............... A42B 3/185 2/10 |

* cited by examiner

*Primary Examiner* — James Jones

(57) ABSTRACT

A magnifying eye goggles assembly includes a frame including a first lateral wall, a second lateral, an upper wall and a lower wall. The frame has an interior surface bounding an interior space. The frame has a forward surface and a rearward surface. A plurality of lenses is mounted in the interior space. Each of the lenses completely extends across the interior space from the first lateral wall to the second lateral wall and from the upper wall to the lower wall. At least one of the lenses magnifies objects viewed through the frame and at least one of the lenses is movable rearward and forward relative to the frame to alter a focal point of magnification. A strap has a first end attached to the first lateral wall and a second end attached to the second lateral wall. The strap retains the frame on a person's head.

10 Claims, 4 Drawing Sheets

MAGNIFYING EYE GOGGLES ASSEMBLY

BACKGROUND OF THE DISCLOSURE

Field of the Disclosure

The disclosure relates to magnifying devices and more particularly pertains to a new magnifying device for assisting a person in magnifying a panoramic view for the person.

SUMMARY OF THE DISCLOSURE

An embodiment of the disclosure meets the needs presented above by generally comprising a frame including a first lateral wall, a second lateral, an upper wall and a lower wall that are attached to each other. The frame has an interior surface bounding an interior space and the lower wall includes an upwardly extending notch to receive a nose. The frame has a forward surface and a rearward surface. The rearward surface is concavely arcuate from the first lateral wall to the second lateral wall and the forward surface is convexly arcuate from the first lateral wall to the second lateral wall. A plurality of lenses is mounted in the interior space. Each of the lenses completely extends across the interior space from the first lateral wall to the second lateral wall and from the upper wall to the lower wall. At least one of the lenses magnifies objects viewed through the frame and at least one of the lenses is movable rearward and forward relative to the frame to alter a focal point of magnification. A strap has a first end attached to the first lateral wall and a second end attached to the second lateral wall. The strap is configured to retain the frame on a person's head such that the person may look through the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
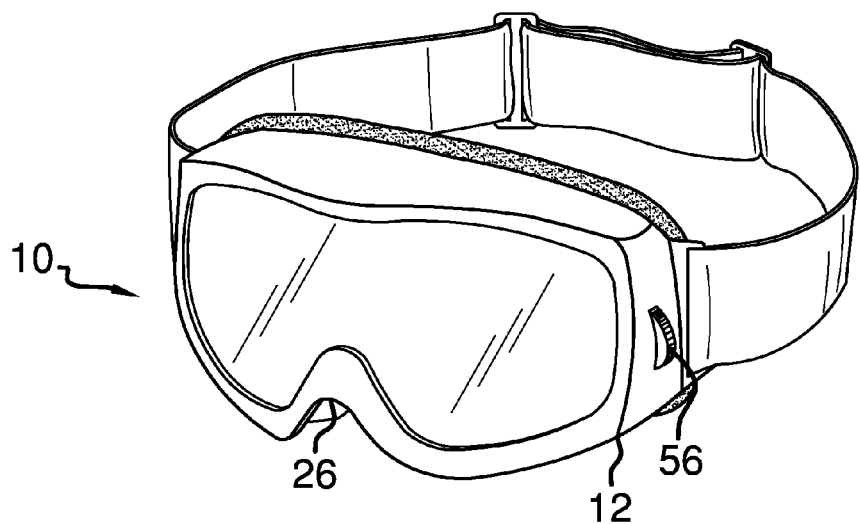
FIG. 1 is a front perspective view of a magnifying eye goggles assembly according to an embodiment of the disclosure.
Figure 2:
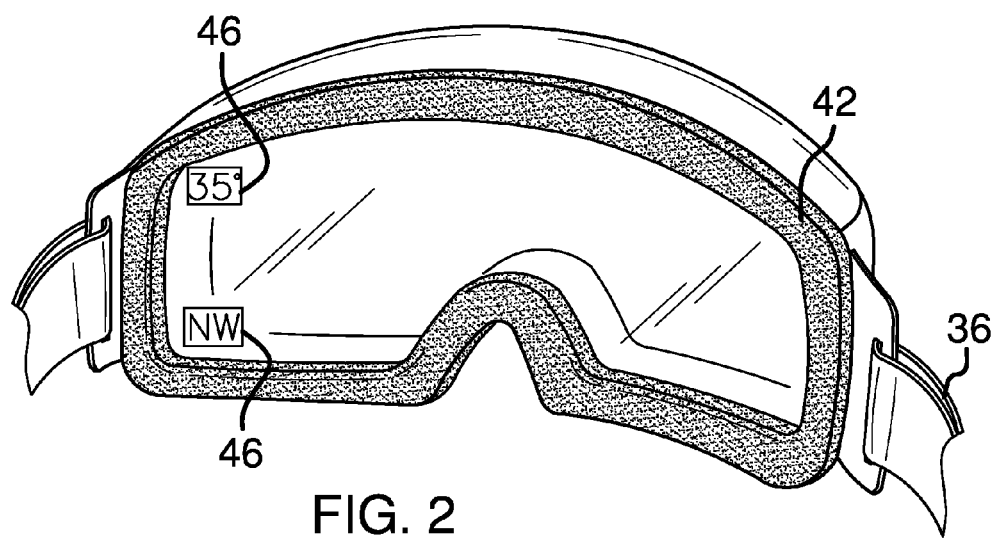
FIG. 2 is a rear perspective view of an embodiment of the disclosure.
Figure 3:
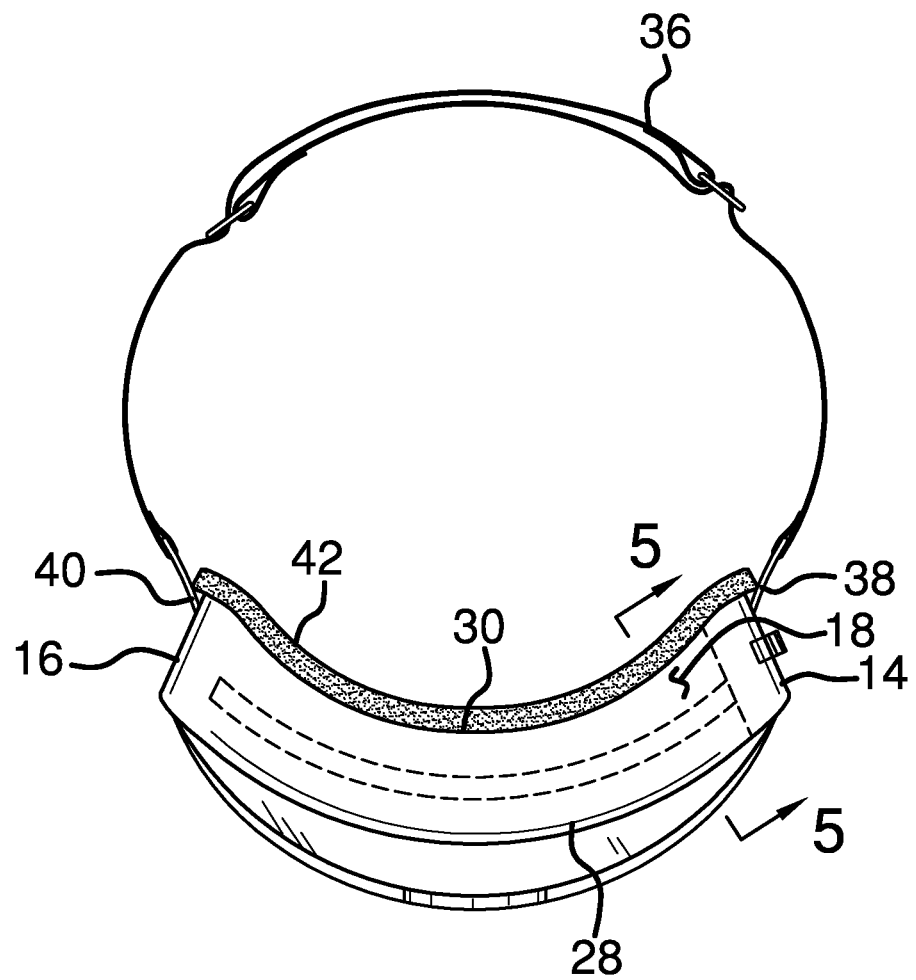
FIG. 3 is a top view of an embodiment of the disclosure.
Figure 4:
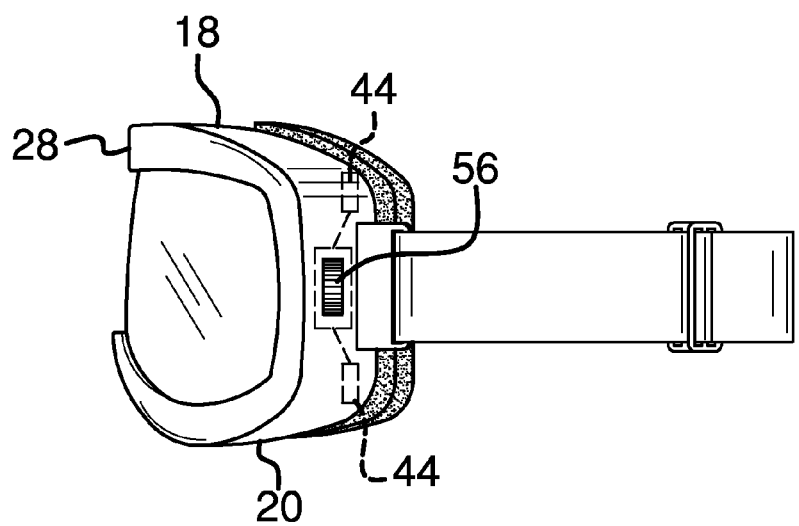
FIG. 4 is a side view of an embodiment of the disclosure.

With reference now to the drawings, and in particular to FIGS. 1 through 6 thereof, a new magnifying device embodying the principles and concepts of an embodiment of the disclosure and generally designated by the reference numeral 10 will be described.

As best illustrated in FIGS. 1 through 6, the magnifying eye goggles assembly 10 generally comprises a frame 12 that includes a first lateral wall 14, a second lateral 16, an upper wall 18 and a lower wall 20 that are attached to each other. The frame 12 thus forms a closed loop and may be comprised of any material typically used for ski goggles and the like. The frame 12 has an interior surface 22 bounding an interior space 24 and may in particular include only a single interior space 24. The lower wall 20 includes an upwardly extending notch 26 configured to receive a nose. The frame 12 has a forward surface 28 and a rearward surface 30. The rearward surface 30 is concavely arcuate from the first lateral wall 14 to the second lateral wall 16 and the forward surface 28 is convexly arcuate from the first lateral wall 14 to the second lateral wall 16. The frame 12 will typically have a resemblance to ski goggles.

A plurality of lenses 32 is mounted in the interior space 24. Each of the lenses 32 completely extends across the interior space 24 from the first lateral wall 14 to the second lateral wall 16 and from the upper wall 18 to the lower wall 20. At least one of the lenses magnifies objects viewed through the frame 12 though at least two of lenses 32 are formed to work in conjunction to magnify objects. At least one of the lenses 32 is movable rearward and forward relative to the frame 12 to alter a focal point of magnification. The lenses 32 may be moved in any number of conventional manners. For example the lens 32 may be moved manually such as done conventionally with a dial on binoculars. Alternatively, the movement may be made by an electric motor 34 or solenoid. Further, the lenses 32 may be fixed with respect to each other in a configuration conventionally known as fixed focus which is used with binoculars wherein objects beyond a certain distance, typically at least 40 feet, to infinity are magnified. Such fixed focus assemblies rely somewhat on the user's eyes for fine focusing. The connection between the lenses 32 and the frame 12 may be made waterproof.

A strap 36 has a first end 38 attached to the first lateral wall 14 and a second end 40 attached to the second lateral wall 16. The strap 36 is configured to retain the frame 12 on a person's head such that the person may look through the frame 12. The strap 36 has an adjustable length and may be comprised of a resiliently stretchable material. A cushion 42 is mounted on the rearward surface 30 of the frame 12. The cushion 42 comprises a resiliently compressible material and may be a foamed elastomer. The cushion 42 is continuous with the rearward surface and may form a watertight or airtight seal between the frame 12 and a face of the user of the assembly 10.

Figure 5:
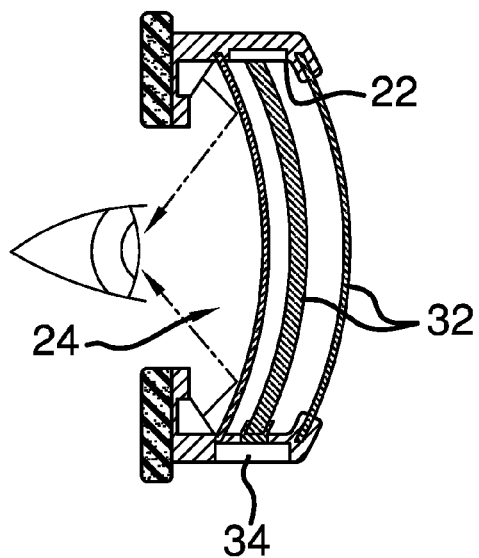
FIG. 5 is a cross-sectional view of an embodiment of the disclosure taken along line 5-5 of FIG. 3.
Figure 6:
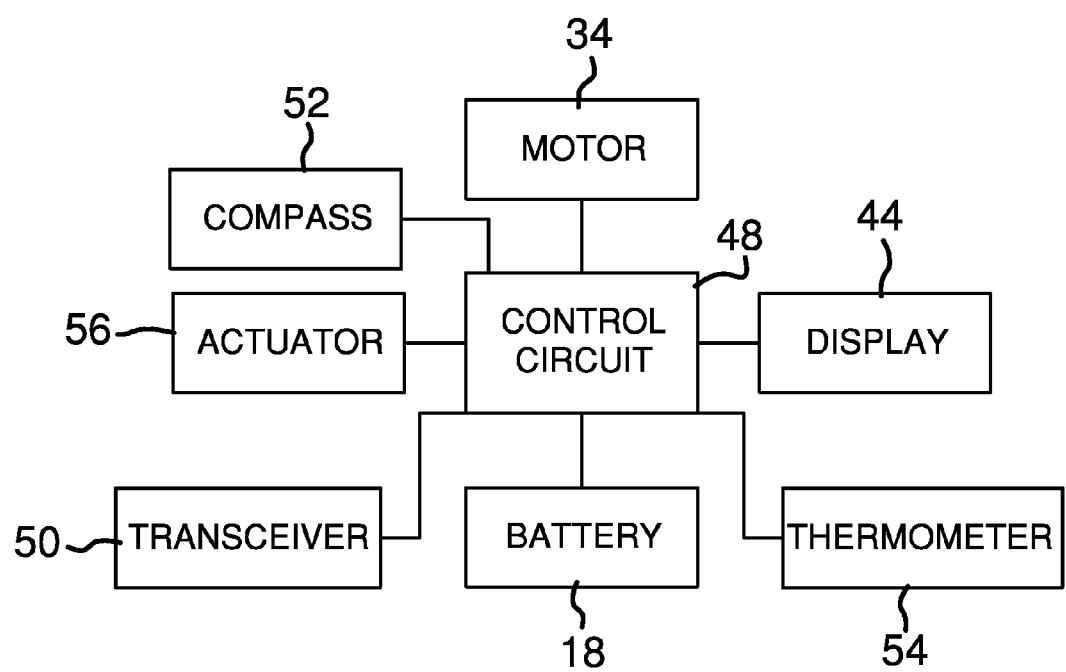
FIG. 6 is a schematic view of an embodiment of the disclosure.

A display 44 is mounted in the frame 12 and projects an image 46 on an inner surface of one of the lenses 36 such that the image 46 is viewable when looking forward through the frame 12. A control circuit 48, or processor, is electrically coupled to the display 44. The display 44, as shown in FIG. 5, may comprise multiple displays 44 forming a heads-up display type array which is generally visible only by the wearer of the assembly 10. The display 44 may be configured to display any number of images 46 and the control circuit 48 may include a transmitter or transceiver 50 for allowing wireless communication with Wi-Fi or Bluetooth sources, for instance, and displaying data images. However, a digital compass 52 may be electrically coupled to the control circuit such that the control circuit 48 displays a compass heading with the display. Additionally, a thermometer 54 may be electrically coupled to the control circuit 48 such that the control circuit 48 displays an ambient temperature with the display 44.

An actuator 56 electrically coupled to the control circuit 48 is actuated to select images 46 to be displayed by the display 44 and to selectively display the compass heading and/or the ambient temperature. While there are multiple ways to achieve this, the actuator 56 may include a dial which may be depressed to scroll through various images 46 to be displayed or to control a motor 34 moving the lens 32. When the lens 32 option is selected, the dial may then be rotated in one direction to move the lens 32 forward and in another direction to move the lens 32 reward. The control circuit 48 may be programmed to display images 46 of the various options that may be controlled or actuated with the actuator 56 when the actuator 56 is first rotated and then activating the selection when the actuator 56 is depressed. As stated, the actuator 56 may comprise different types of actuating means including buttons, touch sensors or the like.

In use, the assembly 10 is worn as would be a typical pair of ski goggles, however the assembly 10 includes the ability to magnify what the wearer is viewing. Thus, if the wearer is wearing the assembly 10 at a sporting event, the wearer can magnify the view of the game and may alter the focal point of magnification as needed to follow the action of the game across a playfield. The assembly 10 further provides the wearer with selectable information such as ambient temperature and compass headings.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A magnifying goggles assembly comprising:
    a frame including a first lateral wall, a second lateral, an upper wall and a lower wall being attached to each other, said frame having an interior surface bounding an interior space, said lower wall including an upwardly extending notch configured to receive a nose, said frame having a forward surface and a rearward surface, said rearward surface being concavely arcuate from said first lateral wall to said second lateral wall, said forward surface being convexly arcuate from said first lateral wall to said second lateral wall;
    a plurality of lenses being mounted in said interior space, each of said lenses completely extending across said interior space from said first lateral wall to said second lateral wall and from said upper wall to said lower wall, at least one of said lenses magnifying objects viewed through said frame, at least one of said lenses being movable rearward and forward relative to said frame to alter a focal point of magnification; and
    a strap having a first end attached to said first lateral wall and a second end attached to said second lateral wall, said strap being configured to retain said frame on a person's head such that the person may look through said frame.

2. The magnifying goggles assembly according to claim 1, wherein said strap has an adjustable length.

3. The magnifying goggles assembly according to claim 1, further including a cushion being mounted on said rearward surface of said frame, said cushion comprising a resiliently compressible material.

4. The magnifying goggles assembly according to claim 3, wherein said cushion is continuous with said rearward surface.

5. The magnifying goggles assembly according to claim 1, further including a display being mounted in said frame and projecting an image on an inner surface of one of said lenses such that the image is viewable when looking forward through said frame, a control circuit being electrically coupled to said display.

6. The magnifying goggles assembly according to claim 5, further including a digital compass being electrically coupled to said control circuit such that said control circuit displays a compass heading with said display.

7. The magnifying goggles assembly according to claim 5, further including a thermometer being electrically coupled to said control circuit such that said control circuit displays an ambient temperature with said display.

8. The magnifying goggles assembly according to claim 6, further including a thermometer being electrically coupled to said control circuit such that said control circuit displays an ambient temperature with said display.

9. The magnifying goggles assembly according to claim 8, further including an actuator electrically coupled to said control circuit, said actuator being actuated to select images to be displayed by said display and to selectively display said compass heading, said actuator being actuated to selectively display said ambient temperature.

10. A magnifying goggles assembly comprising:
    a frame including a first lateral wall, a second lateral, an upper wall and a lower wall being attached to each other, said frame having an interior surface bounding an interior space, said lower wall including an upwardly extending notch configured to receive a nose, said frame having a forward surface and a rearward surface, said rearward surface being concavely arcuate from said first lateral wall to said second lateral wall, said forward surface being convexly arcuate from said first lateral wall to said second lateral wall;
    a plurality of lenses being mounted in said interior space, each of said lenses completely extending across said interior space from said first lateral wall to said second lateral wall and from said upper wall to said lower wall, at least one of said lenses magnifying objects viewed through said frame, at least one of said lenses being movable rearward and forward relative to said frame to alter a focal point of magnification;
    a strap having a first end attached to said first lateral wall and a second end attached to said second lateral wall, said strap being configured to retain said frame on a person's head such that the person may look through said frame, said strap having an adjustable length;

a cushion being mounted on said rearward surface of said frame, said cushion comprising a resiliently compressible material, said cushion being continuous with said rearward surface;

a display being mounted in said frame and projecting an image on an inner surface of one of said lenses such that the image is viewable when looking forward through said frame;

a control circuit being electrically coupled to said display;

a digital compass being electrically coupled to said control circuit such that said control circuit displays a compass heading with said display;

a thermometer being electrically coupled to said control circuit such that said control circuit displays an ambient temperature with said display; and an actuator electrically coupled to said control circuit, said actuator being actuated to select images to be displayed by said display and to selectively display said compass heading, said actuator being actuated to selectively display said ambient temperature.

* * * * *